W. WEHMILLER.
HAY RACK.
APPLICATION FILED SEPT. 12, 1910.

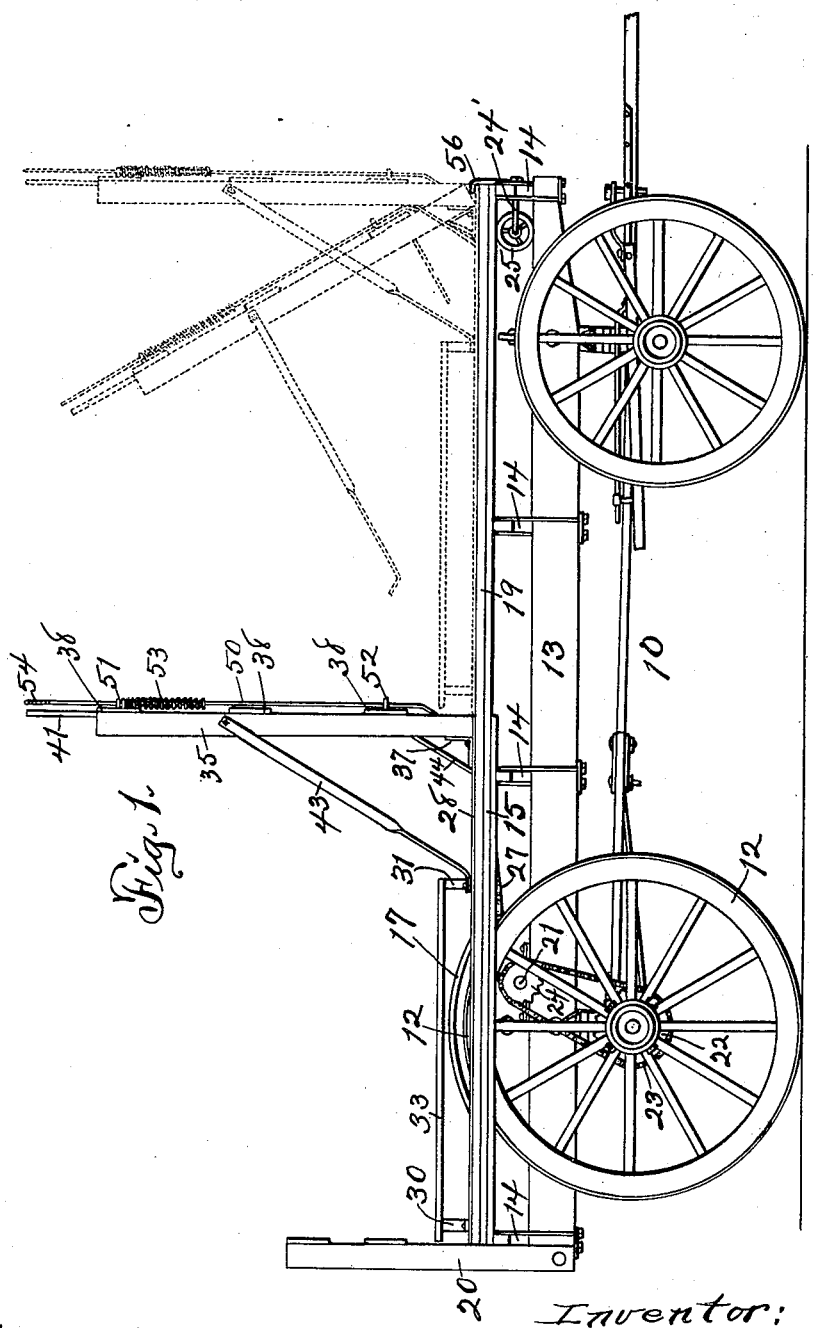

1,023,902.

Patented Apr. 23, 1912.

3 SHEETS—SHEET 2.

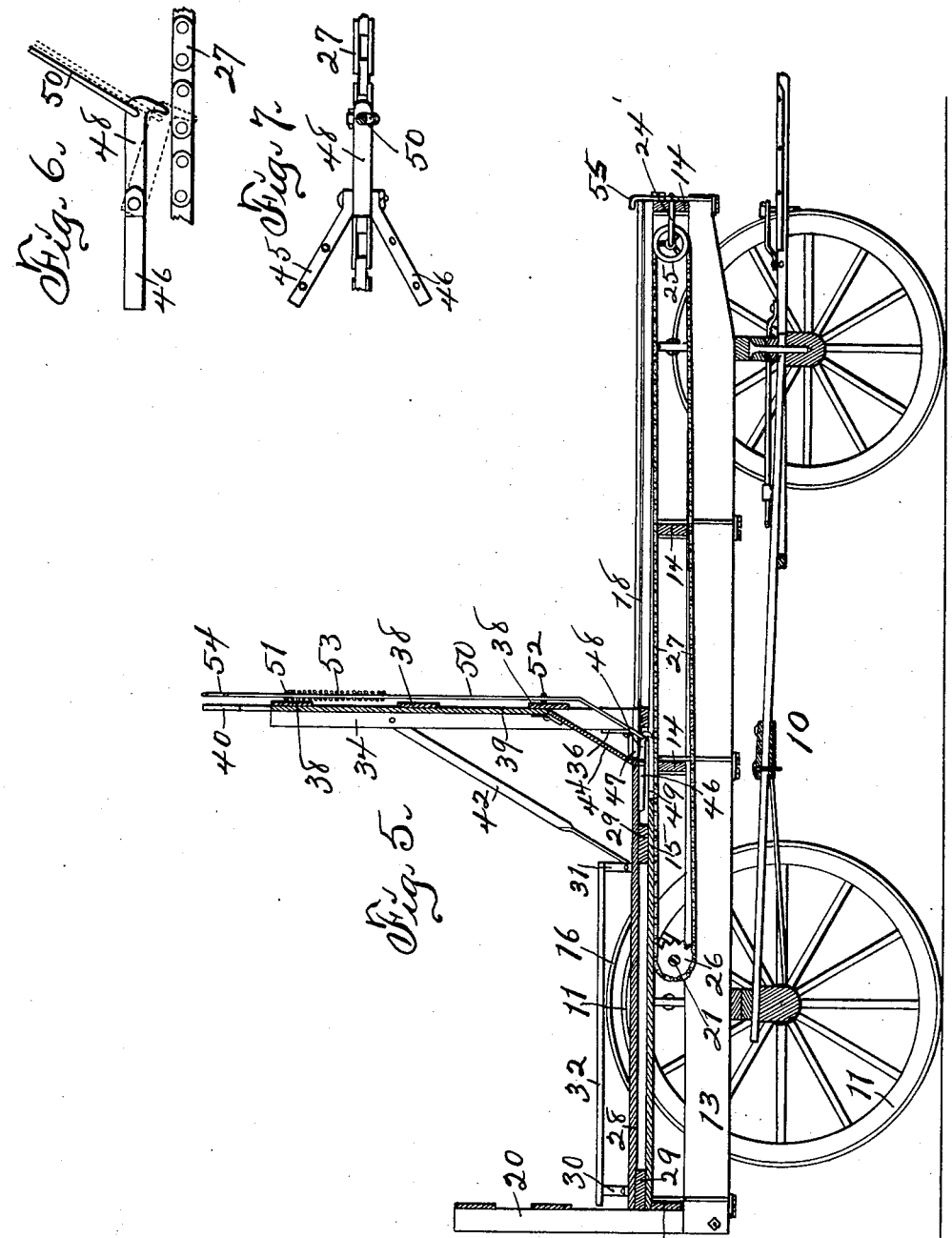

UNITED STATES PATENT OFFICE.

WILLIAM WEHMILLER, OF CLARINDA, IOWA.

HAY-RACK.

1,023,902.    Specification of Letters Patent.    Patented Apr. 23, 1912.

Application filed September 12, 1910. Serial No. 581,677.

*To all whom it may concern:*

Be it known that I, WILLIAM WEHMILLER, citizen of the United States of America, and resident of Clarinda, Page county, Iowa, have invented a new and useful Hay-Rack, of which the following is a specification.

The object of this invention is to provide an improved construction for hay racks.

A further object of this invention is to provide improved means for fitting or adapting a movable portion of a hay rack for various positions relative to high rear wheels of a wagon.

A further object of this invention is to provide improved means for connecting traction wheels of a wagon and a movable portion of a hay rack whereby said movable portion may be carried forwardly by traction of the wagon.

A further object of this invention is to provide improved means for detachably connecting movable portions of a hay rack to traction devices.

My invention consists in the construction, arrangement and combination of elements hereinafter set forth, pointed out in my claims and illustrated by the accompanying drawing, in which—

Figure 1 is a side elevation of my improved rack in primary or initial position for loading, dotted lines representing various parts in adjusted positions. Fig. 2 is a plan of the same on reduced scale. Figs. 3 and 4 are rear and front elevations respectively of the same on the scale of Fig. 2. Fig. 5 is a longitudinal section on the indicated line 5—5 of Fig. 2. Figs. 6 and 7 are detail views of parts of the traction devices and a means employed to connect the movable portion of the rack to the traction devices.

In the construction of the apparatus as shown the numeral 10 designates generally the running gear of a wagon, in this instance illustrated with rear wheels 11, 12 of greater diameter than the front wheels, as is common in the construction of farm wagons. The running gear 10 is shown with the usual bolsters adapted to carry the hay rack. The hay rack is constructed with the usual sills 13, cross-bars 14 carried by and secured to said sills and a platform 15 carried by and secured to some of the cross-bars. The platform 15 preferably is constructed of boards extending parallel with and above the sills 13 and of a length approximating to one-half the length of said sills. The platform 15 is formed with slots over and adapted to receive upper portions of the wheels 11, 12 and said slots are overlaid by arched guards 16, 17 preferably made of metal, extending longitudinally of the rack and fixed at their ends to said platform. Tracks 18, 19 are mounted on the end portions of forward cross-bars 14 and extend along the side margins of the platform 15. A tail gate 20 is fixed to and rises from the rear end portion of the sills 13 and platform 15. A countershaft 21 is mounted in bearings carried by the sills 13 and extends across and above said sills parallel with the rear axle of the wagon. A sprocket wheel 22 on the wagon wheel 12 is connected by a sprocket chain 23 to a sprocket wheel 24 on one end portion of the countershaft 21. A bracket 24' extends rearwardly from the central portion of the foremost cross-bar 14 and a sheave or grooved wheel 25 is pivoted in the rear portion of said bracket. A sprocket wheel 26 is mounted rigidly on the central portion of the countershaft 21 and carries, and is adapted to drive, a sprocket chain 27, which chain also extends around and is supported by the sheave 25. A movable platform 28 is mounted on the tracks 18, 19. The movable platform 28 is of approximately the same length as the stationary platform 15 and is arranged in a plane higher than and parallel with said stationary platform. The movable platform 28 may be constructed of longitudinal boards and suitable cross-pieces 29 for connecting the same and preferably is formed with longitudinal slots or notches open at their rear ends and adapted to admit and straddle the wheel guards 16, 17. Yokes 30, 31 are mounted on the movable platform 28 and arch across end portions of the slots therein, and guards 32, 33, preferably made of wood and straight from end to end, are fixed to and connect said yokes in pairs and are adapted to extend in a horizontal plane above the wheel guards 16, 17. Thus provision is made for locating the movable platform 28 contiguous to and in embracing relations with the upper portions of the wheels 11, 12 and the guards therefor and also for protecting said wheels and the lower guards from a load carried by said movable platform. A head gate is provided and preferably is constructed of posts 34, 35 rising from and connected by hinges 36, 37 to foremost corners of the movable platform 28, cross-bars 38 arranged horizontally and connecting said posts, a cleat 39 connecting central portions of said cross-bars, and braces 40, 41 also connecting said cross-bars and converging to and above the central portion of the head gate.

Props 42, 43 are pivoted at their upper ends to and intermediate the ends of the posts 34, 35 and are detachably connected at their lower ends to and intermediate of the ends of side margins of the movable platform 28. The props 42, 43 may be detached from the movable platform for the purpose of folding the head gate recumbent on said platform as suggested by secondary dotted lines in Fig. 1. A guard 44 is hinged at its upper end to the lower end portion of the cleat 39 and normally extends rearwardly and downwardly therefrom to a position of rest on the center of the forward portion of the movable platform 28. The guard 44 may be moved through an arc manually to release it from the movable platform and permit the head gate to be folded to said platform as shown by dotted lines in Fig. 1. Arms 45, 46 are fixed to and extend downward from the center of the forward portion of the movable platform 28 and a slot 47 is formed in said platform immediately below the guard 44. A hook 48 is pivoted at its rear end to and between the forward ends of the arms 45, 46 and said hook projects downward and slightly rearward at its forward end. The hook 48 is adapted to engage at times with the chain 27 and to permit such engagement a slot 49 is formed in the center of the forward portion of the stationary platform. A rod 50 is slidingly mounted in bearings 51, 52 fixed to and projecting forward from cross-bars 38 of the head gate. The rod 50 is bent rearwardly beneath the lowermost cross-bar 38, extends through the slot 47 and is pivoted at its extremity to the forward portion of the hook 48. A retractile coil spring 53 is mounted on the rod 50, is connected at one end to said rod and at the other end to the bearing 51. It is the function of the spring 53 to move the rod 50 upwardly and hold it in its uppermost position so that said rod will lift and sustain the hook 48 out of engagement with the chain 27. A hand hold 54 is formed on the upper end portion of the rod 50. The spring 53 does not have sufficient force to detach the hook 48 from the chain 27 but is employed merely to lift and hold said hook when it is detached by other means hereinafter described. It will be observed that the guard 44 overlies the rearwardly projecting portion of the rod 50 and protects it from the load carried by the movable platform 28. Stops 55, 56 are fixed to and project upward from the foremost crossbar 14 of the rack and are adapted to engage and limit forward movement of the movable platform 28.

In practical use the movable platform 28 and members carried thereby is primarily adjusted as illustrated on the rear portion of the rack and overlies the fixed platform 15. Thus located the movable platform is within the trajectory of a hay loader adapted to be secured to and trail behind the wagon. When the movable platform has been loaded to its capacity, the driver pushes downward on the rod 50 through the hand hold 54 and causes said rod to move the hook 48, against the resilience of the spring 53, into engagement with the chain 27. It is to be understood that the chain 27 travels coincident with the wagon, having constant driving connection with the traction wheel 12. When the hook 48 engages the chain 27 said chain moves the hook and movable platform connected therewith forwardly, thus moving the movable platform out of the trajectory of the hay loader and to its foremost position on the rack as indicated by primary dotted lines in Fig. 1. When the hook 48 reaches and passes over the sheave 25 it is lifted by the rim of said sheave and is drawn upward by the spring 53 away from said chain, thus disconnecting the movable platform from the chain and suspending the travel of said platform. The stops 55, 56 are supplementary to the other elements and while they do not always serve to stop the movable platform yet they do provide means for preventing accidental movement of said platform forwardly beyond a desired location on said rack. When the movable platform has been moved out of the trajectory of the loader it uncovers the stationary platform 15 within such trajectory and permits it to be loaded to its capacity, which done the loader is detached from the wagon and the load is transported to desired place of deposit.

Particular attention is drawn to the advantages arising from slotting the stationary and movable platforms to accommodate the wheels 11, 12 and providing such slots with guards overlying each other and to the advantages to be derived from the use of driving devices having constant connection with traction wheels and adapted to be attached to the movable platform by manually set and automatically released engaging devices.

I claim as my invention—

1. In a hay rack, the combination of a running gear having a traction wheel, a hay rack having driving connections constantly geared to said traction wheel, said hay rack having a stationary platform and a superposed movable platform, a hook on the movable platform adapted to engage said driving devices at times, and a rod arranged for manual actuation in one direction and spring-drawn in the other direction, which rod is pivoted to said hook.

2. In a hay rack, a movable platform having a slot and a head gate superposed relative thereto, a hook on said movable platform adapted to engage a prime mover, a rod extending through said slot and engaging said hook, said rod slidably mounted on said head gate, and a guard overlying said slot and protecting the lower end portion of said rod.

3. In a hay rack, a movable platform having a slot and a head gate superposed relative thereto, a hook on said movable platform adapted to engage a prime mover, a rod extending through said slot and engaging said hook, said rod slidably mounted on said head gate, a guard overlying said slot and protecting the lower end portion of said rod, and stops limiting forward movement of said movable platform.

Signed by me at Des Moines, Iowa, this thirtieth day of August, 1910.

WILLIAM WEHMILLER.

Witnesses:
S. C. SWEET,
EARL M. SINCLAIR.

Copies of this patent may be obtained for five cents each, by addressing the "Commissioner of Patents, Washington, D. C."